(12) United States Patent
Auterinen

(10) Patent No.: US 10,110,752 B2
(45) Date of Patent: Oct. 23, 2018

(54) COMMUNICATIONS SYSTEM AND METHOD

(75) Inventor: Otso Auterinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 488 days.

(21) Appl. No.: 10/519,092

(22) PCT Filed: Jun. 12, 2003

(86) PCT No.: PCT/IB03/02663
§ 371 (c)(1),
(2), (4) Date: Feb. 17, 2005

(87) PCT Pub. No.: WO2004/004250
PCT Pub. Date: Jan. 8, 2004

(65) Prior Publication Data
US 2005/0255850 A1    Nov. 17, 2005

(30) Foreign Application Priority Data

Jun. 28, 2002 (GB) .................................. 0215013.4

(51) Int. Cl.
*H04M 15/00* (2006.01)
*H04Q 7/38* (2006.01)
(Continued)

(52) U.S. Cl.
CPC ........... *H04M 15/00* (2013.01); *H04M 15/46* (2013.01); *H04M 15/8016* (2013.01);
(Continued)

(58) Field of Classification Search
USPC .... 370/230, 231, 235, 395.21, 395.3, 395.4, 370/395.41, 395.42, 395.43, 395.51,
(Continued)

(56) References Cited

U.S. PATENT DOCUMENTS 6,185,736 B1    2/2001  Ueno
6,434,380 B1 *  8/2002  Andersson et al. .......... 455/406
(Continued)

FOREIGN PATENT DOCUMENTS

EP          1264503 B1    12/2002
WO      WO 97/026739    *   1/1997
(Continued)

OTHER PUBLICATIONS

Yavatkar et al, "A Framework for Policy-Based Admission Control", Network Working Group, IETF RFC 2753, Jan. 2000, pp. 1-20, XP002235541, retrieved from Interent: URL:http://www.cs.utk.edu/{moore/RFC-PDF/rfc2753.pdf.
(Continued)

*Primary Examiner* — Candal Elpenord
(74) *Attorney, Agent, or Firm* — Mintz Levin Cohn Ferris Glovsky ande Popeo, P.C.

(57) ABSTRACT

A system comprising a user equipment, a resource node configured to manage resources for communication with the user equipment, a managing node configured to manage traffic flow. The resource node and the managing node are configured so that information is passed between the resource node and the managing node, the managing node may select at least one parameter for a new traffic flow based on the information.

22 Claims, 3 Drawing Sheets

(51) Int. Cl.
*H04W 28/10* (2009.01)
*H04W 28/18* (2009.01)
*H04W 72/00* (2009.01)

(52) U.S. Cl.
CPC .... *H04M 15/8033* (2013.01); *H04M 2215/32* (2013.01); *H04M 2215/56* (2013.01); *H04M 2215/7414* (2013.01); *H04M 2215/7435* (2013.01); *H04W 28/10* (2013.01); *H04W 28/18* (2013.01); *H04W 72/00* (2013.01)

(58) Field of Classification Search
USPC ........ 370/395.2, 328, 338, 230.1; 455/452.2, 455/450–453, 405–407
See application file for complete search history.

(56) References Cited

U.S. PATENT DOCUMENTS

| | | | |
|---|---|---|---|
| 6,445,916 B1* | 9/2002 | Rahman | 455/423 |
| 6,483,835 B1* | 11/2002 | Tanigawa et al. | 370/395.21 |
| 6,615,262 B2* | 9/2003 | Schweitzer et al. | 709/224 |
| 6,631,122 B1* | 10/2003 | Arunachalam et al. | 370/332 |
| 6,728,365 B1* | 4/2004 | Li et al. | 379/329 |
| 6,822,940 B1* | 11/2004 | Zavalkovsky et al. | 370/237 |
| 6,850,764 B1* | 2/2005 | Patel | 455/450 |
| 6,934,527 B1* | 8/2005 | Hamada | 455/405 |
| 6,959,001 B1* | 10/2005 | Parks | 370/410 |
| 6,978,144 B1* | 12/2005 | Choksi | 455/452.2 |
| 6,996,401 B2* | 2/2006 | Agin | 455/453 |
| 7,043,225 B1* | 5/2006 | Patel et al. | 455/405 |
| 7,068,600 B2* | 6/2006 | Cain | 370/230.1 |
| 7,167,447 B2* | 1/2007 | Puuskari et al. | 370/231 |
| 7,433,311 B1* | 10/2008 | Kalyanasundaram et al. | 370/235 |
| 7,580,424 B2* | 8/2009 | Ravishankar et al. | 370/468 |
| 2002/0036983 A1 | 3/2002 | Widegren et al. | |
| 2002/0068545 A1* | 6/2002 | Oyama et al. | 455/406 |
| 2002/0083185 A1 | 6/2002 | Ruttenberg et al. | |
| 2002/0097747 A1* | 7/2002 | Kirkby et al. | 370/468 |
| 2002/0127995 A1* | 9/2002 | Faccinn et al. | 455/406 |
| 2002/0160748 A1* | 10/2002 | Rahman et al. | 455/406 |
| 2002/0191572 A1* | 12/2002 | Weinstein et al. | 370/338 |
| 2003/0009580 A1* | 1/2003 | Chen et al. | 709/231 |
| 2003/0147373 A1* | 8/2003 | Pelaez et al. | 370/349 |
| 2004/0248583 A1* | 12/2004 | Satt et al. | 455/452.2 |
| 2005/0076339 A1* | 4/2005 | Merril et al. | 718/104 |

FOREIGN PATENT DOCUMENTS

| | | |
|---|---|---|
| WO | WO 00/10357 | 2/2000 |
| WO | WO 00/70831 | 11/2000 |
| WO | WO 01/65779 | 9/2001 |
| WO | WO 03/019877 | 3/2003 |

OTHER PUBLICATIONS

K. Chan et al, "COPS Usage for Policy Provisioning (COPS-PR)", IETF RFC 3084, Mar. 2001, pp. 1-38, XP002235542, retrieved from Internet: URL:http://www.cs.utk.edu/{moore/RFC-PDF/rfc3084.pdf.

EPO Communication pursuant to Article 94(3) EPC dated May 8, 2009, issued in connection with counterpart EP Application No. 03732938.0-2416.

* cited by examiner

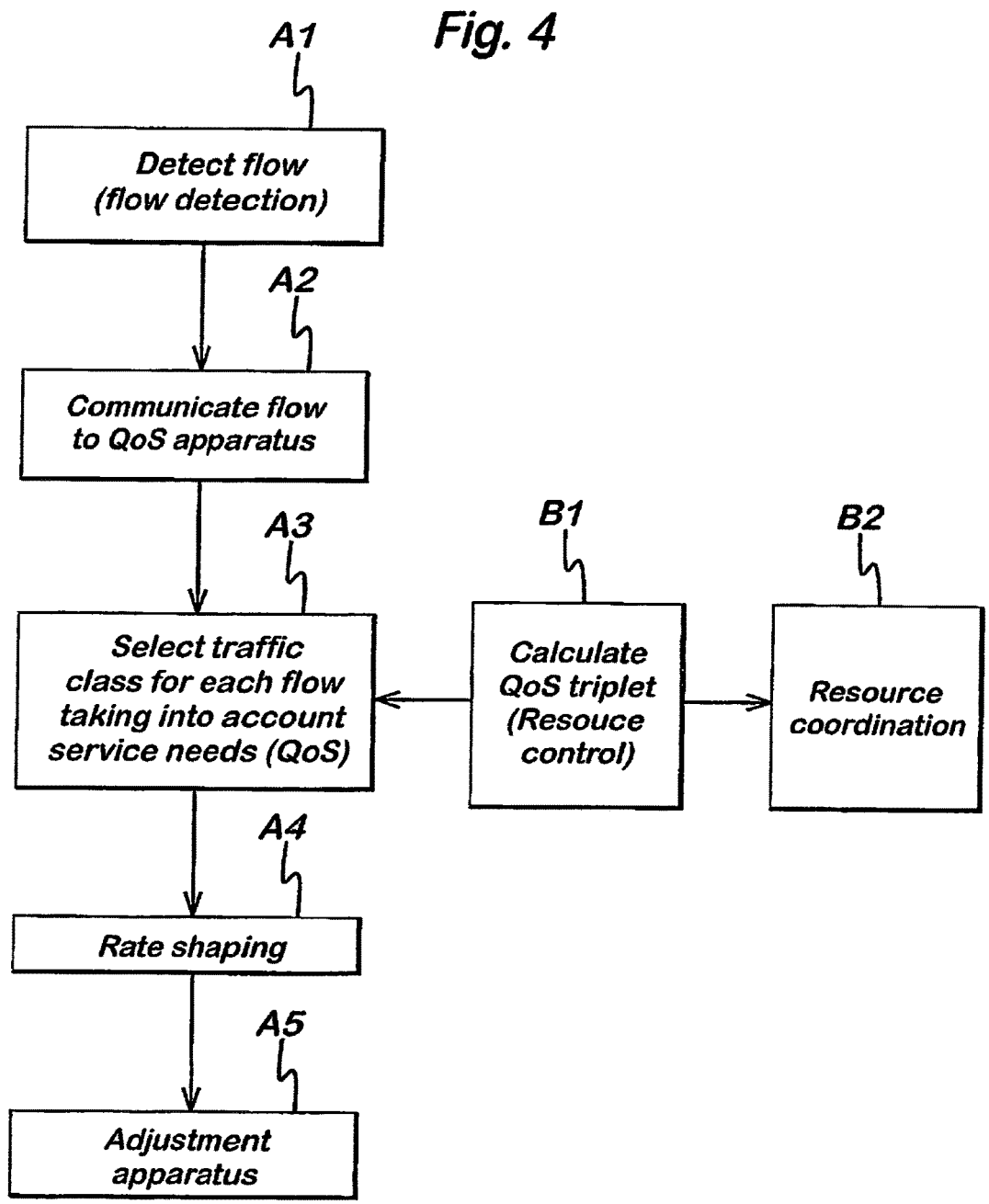

COMMUNICATIONS SYSTEM AND METHOD

FIELD OF THE INVENTION

The present invention relates to a communications system and method and in particular and but not exclusively to an internet protocol (IP) based system and method.

BACKGROUND TO THE INVENTION

Wireless cellular communication networks are known. In these networks, the area covered is divided into a number of cells. Each cell has associated with it a base transceiver station. The base transceiver stations are arranged to communicate with mobile stations located in the cells associated with the base transceiver stations.

There are a number of different standards which govern the communication between mobile stations and base stations as well as with other network elements. One example of a currently known standard is the GSM standard (Global System for Mobile Communications). At the present time, work is being carried out on the so called third generation standard. One example of these third generation standards is the UMTS (Universal Mobile Telecommunications System) Standard. In general, the third generation standards use code division multiple access in the radio interface between mobile stations and base transceiver stations.

Currently, it is proposed in at least some third generation standards to use the internet protocol IP in the radio access network (RAN).

Currently, the access charge for a certain type of access is the same regardless of the location of the user equipment. Thus, if the user is in an area covered by a particular network operator, the cost to the user will be same throughout the network. This has generally been the case in that the base stations are generally owned by the operator and the subscriber will have a contract with the network operator which is based on fixed charges. The current system thus does not allow the provision of access nodes, such as base transceiver stations, by third parties. Accordingly, the issue of charging is not even addressed where the access node is provided by a third party. Furthermore, the current standards do not provide much flexibility in the charging of a user in dependence of location of the user and local loading conditions.

SUMMARY OF THE INVENTION

It is an aim of embodiments of the present invention to address one or more of the problems described above.

According to one aspect of the invention, there is provided a communications system comprising:
  at least one user equipment:
  at least one resource node arranged to manage resource for communication with said at least one user equipment;
  at least one managing node for managing traffic flow, wherein said at least one, resource node and said at least one managing node are arranged so that information is passed between at least one resource node and at least one managing node, said at least one managing node selecting at least one parameter for a new traffic flow based on said information.

Embodiments of the present invention provide a method, a system and the network elements for executing a traffic class/cost negotiation for a new traffic flow, upon a change in traffic conditions, in an access network.

BRIEF DESCRIPTIONS OF DRAWINGS

For a better understanding of the present invention and as to how the same may be carried into effect, reference will now be made by way of example only to the accompanying drawings in which:

FIG. 4 shows a flow diagram of a method embodying the present invention.

DETAILED DESCRIPTION OF PREFERRED EMBODIMENTS OF THE PRESENT INVENTION

Figure 1:
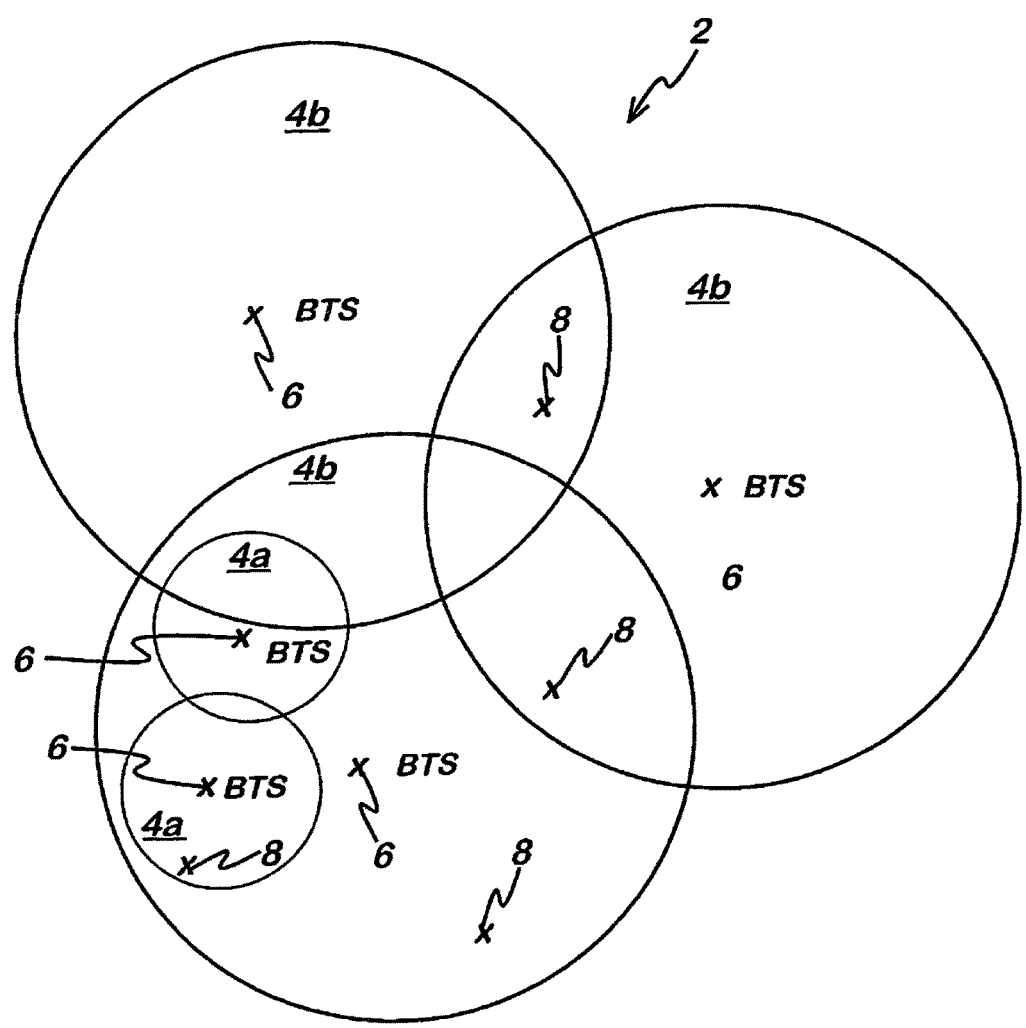
FIG. 1 shows a cellular communications network in which embodiments of the present invention can be incorporated.

Reference is first made to FIG. 1 which shows a cellular communications network 2 in which embodiments of the present invention can be incorporated. The area covered by the network is divided into cells 4. As can be seen from FIG. 1 there are two types of cells shown. Cells 4a are much smaller than cells 4b. The large cells 4b generally cover the area of the network and, as shown in FIG. 1 may at least partially overlap. The smaller cells 4a are arranged to overlap the larger cells 4b. The smaller cells 4a may be provided by the network operator to deal with traffic hotspots. Alternatively, the smaller cells may be part of a wireless LAN (Local Area Network) operated by a third party. Alternatively, the cells 4a may be provided by third parties for the purposes which will be discussed in more detail hereinafter.

Each cell is provided with a base transceiver station 6. The base transceiver station 6 is arranged to communicate with user equipment 8. Where the user equipment is in a location served by more than one base station, one or other or even both of the base transceiver stations may service that user equipment. The user equipment may be a mobile telephone, computer, personal digital assistant or any other entity. The user equipment may be fixed or mobile.

Figure 2:
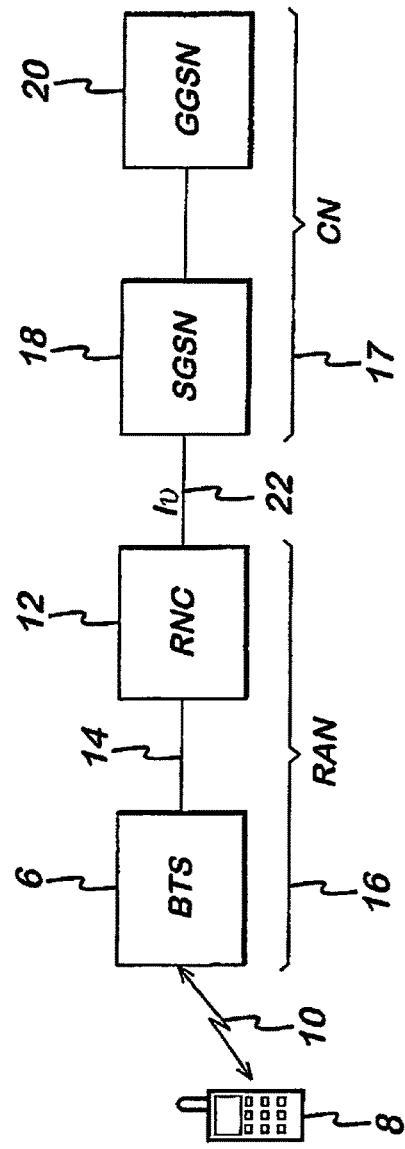
FIG. 2 shows a schematic view of elements of the communications network in which embodiments of the present invention can be incorporated.

Reference will now be made to FIG. 2 which shows the hierarchy of the network of FIG. 1. The user equipment 8 is arranged to communicate with the base station 6 via an air interface 10. In other words, the communication between the user equipment 8 and the base transceiver station 6 is via a wireless connection which may for example utilise WLAN, GSM, EDGE, WCDMA, CDMA or some other radio technology. The base station 6 may be an IP base station, that is one which can be used in a IP radio access network structure or may be a non IP base station, such as some base stations in the so called third generation standards or a base station in a GSM system.

The base station 6 is connected to a radio network controller 12 via a interface 14. The interface may be Iub, Iu', It should be appreciated that in practice the radio network controller RNC 12 is arranged to control a number of base stations. Furthermore, a number of radio network controllers 12 are provided. The radio network controller 12 owns and controls the radio resources in its domain. The RNC 12 is a service access point for all services which the UTRAN (UMTS Terrestrial Radio Access Network, ie the base stations and radio network controllers) provide the core network, which will be described in more detail hereinafter. This may for example be the management of connections to the user equipment 8.

The core network comprises a SGSN 18 (Serving GPRS (General Packet Radio Service) Support Node) and a GGSN (Gateway GPRS Support Node) 20.

The connection between the RNC 12 and the SGSN 18 is via the Packet Switched Iu interface 22. The SGSN 18 is typically used for packet switched services. Effectively the SGSN 18 is used to switch the packet switched transactions. The GGSN 20 is the switch at the point where the network is connected to external packet switched networks. All incoming and outgoing packet switched connections go through the GGSN 20.

It should be appreciated that FIG. 2 is a schematic view of a network. Variations on this network are possible with embodiments of the present invention. Some of these elements may not be present, and other elements may replace or be provided instead of the element shown.

Figure 3:
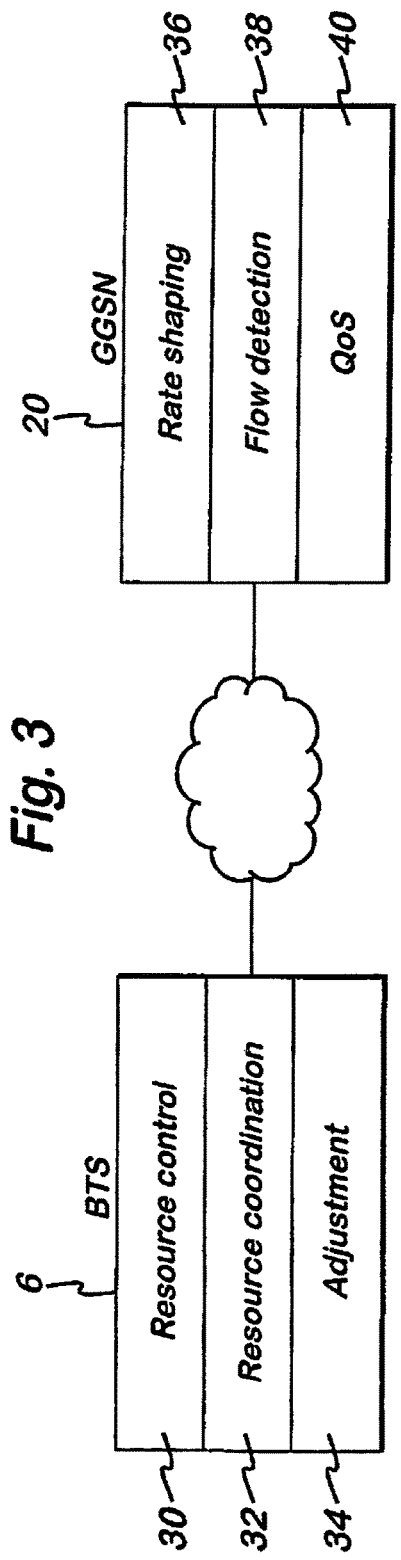
FIG. 3 shows circuitry used in embodiments of the present invention.

Reference is made to FIG. 3 which shows elements of the embodiments of the present invention. The base transceiver station 6 includes a resource control apparatus 30, a resource coordination apparatus 32 and an adjustment apparatus 34. The GGSN 20 comprises rate shaping apparatus 36, flow detection apparatus 38 and quality of service apparatus 40. In practice the apparatus of the base transceiver station 6 and the. GGSN 20 will be provided by circuitry and/or be implemented in software.

The resource control apparatus 30 is arranged to control the radio access resources allocated in a cell to an access network connection such as a PDP context or data flow. A flow is for example data traffic relating to an application or to an individual process within an application or to a combination of flows with common quality of service requirements establishing an aggregate flow. The resource control apparatus 30 includes logic which calculates a target bit rate for each traffic class. The resource control apparatus is also arranged to calculate a cost for each traffic handling class. The cost is calculated on the volume of traffic The cost is calculated for suitable units of traffic volume. A cost is calculated e.g. for packet sizes used at the air interface. The cost is applied to all flows which use the cell and traffic class.

The traffic handling class may take into account the type of connection for example whether the connection is a -voice connection or a data connection. The traffic handling class can also take into account the volume of data to be transferred and for example the capabilities of the user equipment. The traffic class is used in embodiments of the present invention to indicate a set of quality of service QoS parameters values which include at least (and in some embodiments only) the target bitrate—or target bitrates for uplink UL and DL downlink connections.

The resource control apparatus 30 uses information about the actual flows to be served. In other words, the calculated target bit rate, cost and traffic class take into account the Radio Access Bearers currently in progress as well as the new radio access bearer to be initiated. The result of the calculations carried out by the resource control apparatus 30 provides the triplet of information which is referred to as the quality of service triplet.

The quality of service apparatus 40 is arranged to select a suitable traffic class for each flow according to the service needs particularly taking into account the required bit rate. This apparatus only selects a suitable traffic class for the new traffic flows and does not alter existing traffic flows. This selection made by the quality of service apparatus 40 is based on the quality of service triplet provided by the resource control apparatus. In preferred embodiments of the present invention there is a traffic class negotiation between the radio access node and the edge node for each new flow. The negotiation includes a communication of cell level triplets about-traffic class, target bit rate for a flow and cost from the radio access network to the edge node. The edge node allocates a traffic class for each new flow on the basis of the service needs. In other words, the target bit rate and costs are taken into account when determining the traffic class. The traffic class is selected in a preferred embodiment of the invention based on (1) the quality of service QoS properties—including bitrate—available with the traffic class, (2) the needed bitrate to ensure the desired user experience with the application and (3) the cost allowed (e.g access cost tolerable for the application/service provider) for the service.

The quality of service apparatus 40 is located in at the "intelligent edge" of the access network where the service needs and allowed costs are known. In the embodiment of the present invention shown in FIG. 3, this intelligent edge is provided by or at the GGSN 20. However, it should be appreciated that the quality of service apparatus 40 may be provided at another suitable location.

The quality of service apparatus 40 is responsible for introducing the flow. In other words, the quality of service apparatus allows a new flow.

The resource control apparatus 30 and the quality of service apparatus 40 make up an outer control loop. This control loop finds ? the right traffic class for each flow.

The resource coordination apparatus 32 has the ability to balance the load of cells so that target bit rate per traffic class in adjacent cells is equal or is as similar as possible In one embodiment of the present invention, the target bit rates are set in configuration of the radio access NW network, and in this simple case the coordination is only about the ability to accept the given configuration parameters. More complicated alternatives are of course possible in embodiments of the present invention. In particular the resource coordination apparatus 32 is arranged to adjust the cell size (for example altering the power with which the base transceiver station transmits), alter the cell selection or use any other similar mechanism to provide balanced loads. The resource coordination logic 32 typically aims to provide a predefined differential of traffic classes and predefined minimum bit rates in upper traffic classes.

The adjustment apparatus 34 is provided for the flow control of packets to guide the actual bit rate towards the target bit rate of the flow. For example, the apparatus can for example control the TCP (Transport Control Protocol) window size by not allowing a window size which would cause a higher bit rate than the target. In other words, the bit flow is slowed down to meet the target bit rate.

The rate shaping apparatus 36 is arranged to enforce downlink flow. For uplink packets the rate shaping apparatus may be located in the user equipment.

The flow detection apparatus 38 operates at the end of the access network. The flow detection apparatus 38 detects new flows and communicates them to the quality of service apparatus 40. New uplink flows are initially a component of the default flow, that is the PDP context. The flow detection apparatus 38 may make a decision to leave the flow-as a component of the default flow, in which case the quality of service apparatus 40 is not informed.

As will be appreciated, there is a communication mechanism: to communicate the existence of the flow and associated traffic handling class from the quality of service apparatus 40 to the resource control apparatus 30 and adjustment apparatus 34. In preferred embodiments of the present invention, this is done via the SGSN 18 and RNC 12. However, it should be appreciated that any other suitable mechanism can be used for transferring data between the required entities.

Reference is made to FIG. 4 which shows a flow chart of an embodiment of the present invention. In step A1 the flow detection apparatus 38 detects the new flows. In step A2 the flow detection apparatus 38 communicates the new flows to the quality of service apparatus 40.

In step A3, the quality of service apparatus 40 selects a suitable traffic class for the flow taking into account the service needs, in particular the required bit rate. It should be appreciated that the selected traffic class takes into account the quality of service triplet which is calculated in step B1 by the resource control apparatus 30.

In step A4, any rate shaping required takes place. In other words, any packet dropping which needs to be done, takes place.

In step A5, any adjustment required by the adjustment apparatus 34 takes place. This is for the control of packets to guide the actual bit rate towards the target bit rate. This will typically increase or decrease the bit rate as required.

In step B2, the resource coordination apparatus 32 takes steps to balance the load of cells.

It should be appreciated that step B1 occurs prior to step A3. Step B1 may occur before, after or during steps. A1 and 2. Step B2 is shown as taking place after the step B1. However, step B2 may in certain embodiments of the present invention take place at any other suitable time.

Steps A4 and A5 may be omitted or may be carried out so that step A5 occurs before step A4.

It should be appreciated that the calculated cost using the negotiation need not be the actual cost paid by the subscriber or end user of a service or application. Instead, it can be, for example, partially or totally charged from the core network operator or the application service provider.

In some embodiments of the present invention, the adjustment apparatus may be omitted. For uplink flow, an adjustment apparatus may be provided in the mobile station. Likewise, as far as the rate shaping apparatus is concerned, for up link packets, this may be located in the user equipment.

Embodiments of the present invention are particularly applicable when a base station is not operated by the core network operator. For example, the base station may be part of an internal wireless LAN or may be provided as a commercial enterprise. In the case of the base station which is part of the wireless LAN, there may be extra capacity which could then be used by a user, which is not party to the wireless LAN. The base station may be provided by a separate operator which wants to provided particular service.

Embodiments of the present invention thus allow localised cost, that is, access cost differentiation based on location and services. Alternatively or additionally, the cost may be dependent on time, for example time of day, day of the week or the like.

Embodiments of the invention also allow bargaining about costs and quality of service between, the access network edge (for example the GGSN) and the radio access node (for example the BTS). Thus, embodiments of the present invention can have a base station which is an investment by third parties to serve a location. This investment can be funded or sponsored by the interest groups of a specific location. For example, service providers are one possible interest group which could fund a base station investment in selected areas.

Embodiments of the present invention allow the integration of new access technologies such as wireless LAN into mobile access networks. This is because there is the negotiation between the base station and the GGSN.

During the negotiation between the base station and the GGSN the traffic class can be selected in dependence on cost. This may mean, for example, that a lower bit rate than the optimal bit rate may be used for a particular connection. It should be appreciated that certain types of call may only have a limited range of possibilities as to an acceptable traffic class. For example, some types of call may only be able to have a particular traffic class. The call can proceed or not based on the call cost. The call can proceed or not depending on the available target bit rate for a given class.

In some embodiments of the present invention the resource control apparatus may offer different quality of service information to different quality of service apparatusa. In other words, depending on the quality of service apparatus, different methods may be used to calculate the triplets. This enables radio access network sharing among virtual access operators and access cost. differentiation between service domains.

One example of a triplet calculation method based on "high end pays more" is described. A reference setup for triplets is a linear cost (per volume unit) increase with bitrate. The cost per volume unit in a traffic class is CostPerUnit=BasicCost+C *(TargetBitrate−BasicBitrate).

Typically factor C is increased if there is more demand than can be served. In lower traffic classes, Cost per Volume Unit may be kept constant> the cost is decreased proportionally with the target bitrate.

It should be appreciated that in some embodiments of the present invention the resource control logic may use different methods in determining the cost of a given traffic class. In other words, at least two different traffic classes may use different methods in order to determine the cost.

In embodiments of the present invention, some of the apparatus are described as being in the base transceiver station whilst other of the apparata are described as being in GGSN. It should be appreciated that any of the apparatus may be located in any other suitable node. For example, the resource coordination apparatus may be provided in a RNC or similar logic element.

Embodiments of the present invention may be used with a an OWLAN Operator-Wireless LAN. This is a WLAN operated by a mobile operator. This means a known business model of a mobile operator where access cost is paid by the subscriber on a time or volume basis and roaming agreements are used to define how money is shared between visited network NW and the home operator. When used with embodiments of the invention, charging based on location can be implemented.

It should be appreciated that communication between the edge node and the IPBTS can be based on GTP (GPRS Tunnelling protocol) or MPLS Multiprotocol Label Switching. Label switched tunnels are set across a part of an IP network. The nodes in the network forward packets based on the label set by the ingress node (where the LSP (label switched path) starts) instead of the destination IP address. Per hop behaviour is defined for each label which enables use of LSPs as a QoS mechanism. Traffic classes may be mapped to label switched paths connecting the base station and edge nodes A LSP is chosen to meet the QoS requirements such as delay, and not to exceed the planned maximum load of LSPs. To know the actual limits, Resource control apparatus will communicate with a network NW level MLPS (or IP) traffic coordinator unit. The communication with traffic control would about negotiating the aggregate bitrate for each LSP between IP BTS and GGSN (or IPBTS to RAN GW (radio access network gateway, and RAN GW to GGSN separately. To apply the limits, the cost adjustment per traffic class can be used as for air interface resources.

It should be appreciated that alternative or additional information may be provided in the negotiation between the radio access node and the edge node. Other quality of service parameters include maximum bit rate, guaranteed bit rate, delivery order, traffic handling priority, allocation/retention priority, maximum SDU (Service Data Unit) size, SDU format information, SDU error ratio, residual bit error ratio, and source statistics descriptors.

In some embodiments of the present invention, the GGSN would after negotiating with the access node, request the subscribers acceptance for the cost negotiated. Alternatively, if the GGSN has some information about the knowledge of services and user preferences for the user, then the GGSN or some other node can make the decision.

Embodiments of the present invention are particularly applicable to wireless LAN. In those circumstances, the BTS would instead be a wireless LAN radio access node and GGSN would be the equivalent of wireless LAN node.

In some embodiments of the present invention, the charging function is provided by the radio network controller. In those embodiments of the present invention, the negotiation may involve RNC. The RNC may replace the base transceiver station in the negotiation or may replace the GGSN or may form part of the negotiation between these entities.

The invention claimed is:

1. A method, comprising:
   determining, at a resource node configured to provide a radio access network to a user equipment, information for the local access at the radio access network;
   passing, from the resource node and to a managing node, the information to trigger the managing node to select at least one parameter for a new traffic flow for the user equipment, the selection based at least in part on the information, the at least one parameter including a cost parameter for the access to the radio access network; and
   enforcing quality of service control for the new traffic flow, by the resource node, the enforcing based on the at least one parameter for the new traffic flow.

2. A method as claimed in claim 1, further comprising: negotiating in order to select the at least one parameter.

3. A method as claimed in claim 1, wherein the information for the access comprises a type of traffic for the access.

4. A method as claimed in claim 1, wherein said information is determined for a plurality of different traffic handling classes.

5. A method as claimed in claim 1, wherein the at least one parameter further includes a traffic handling class and a target bit rate.

6. A method as claimed in claim 1, wherein said resource node is an access node.

7. A method as claimed in claim 1, wherein the managing node further provides guiding an actual flow rate to a target flow rate.

8. A method as claimed in claim 1, wherein the managing node further provides detecting a new flow.

9. A method as claimed in claim 1, wherein the resource node further provides balancing a load between available resources.

10. A method as claimed in claim 1, wherein communication between the managing node and the resource node is via a general packet radio service tunneling protocol or a multi-protocol label switching protocol.

11. An apparatus, comprising:
    at least one processor; and
    at least one memory including computer program code, the at least one processor, the at least one memory, and the computer program code configured to cause the apparatus to at least:
    manage a traffic flow;
    receive, from a resource node configured to provide a radio access network to a user equipment, information for the local access at the radio access network;
    select at least one parameter for a new traffic flow for the user equipment, the selection based at least in part on the information, the at least one parameter including a cost parameter; and
    send the selected parameter to the resource node to trigger the resource node to enforce quality of service control for the new traffic flow, based on the at least one parameter for the new traffic flow.

12. An apparatus as claimed in claim 11, wherein the at least one parameter further includes a traffic handling class and a target bit rate.

13. An apparatus as claimed in claim 11, wherein said apparatus is comprised in a managing node located at an edge of a network.

14. An apparatus as claimed in claim 11, wherein said apparatus is comprised in a managing node comprising a gateway general packet radio service support node.

15. An apparatus, comprising:
    at least one processor; and
    at least one memory including computer program code, the at least one processor, the at least one memory, and the computer program code configured to cause the apparatus to at least:
    determine, at a resource manager configured to provide a radio access network to a user equipment, information for the local access at the radio access network; and
    pass the information to a managing node to trigger the managing node to select at least one parameter for a new traffic flow for the user equipment, the selection based at least in part on the information, the at least one parameter including a cost parameter,
    wherein the resource manager is further configured to enforce quality of service control for the new traffic flow, based on the at least one parameter for the new traffic flow.

16. An apparatus as claimed in claim 15, wherein the apparatus comprises an access node at the edge of the radio access network serving the user equipment.

17. An apparatus as claimed in claim 16, wherein the access node is a base station or radio network controller.

18. An apparatus as claimed in claim 15, wherein the information for the access comprises a type traffic for the access.

19. An apparatus as claimed in claim 15, wherein the apparatus further comprises a load balancer configured to balance a load between available resources.

20. A method comprising:
    managing, at a node, a traffic flow;

receiving, at the node and from a resource node configured to provide a radio access network to a a user equipment, information for the local access at the radio access network;

selecting at least a quality of service parameter and a charging parameter for a new traffic flow for the user equipment, the selection based at least in part on the information; and sending the selected parameters to the resource node to trigger the resource node to enforce quality of service control for the new traffic flow, based on the quality of service parameter and the charging parameter for the new traffic flow.

21. A non-transitory computer readable medium that, when executed by at least one processor, performs instructions comprising:

determining, at a resource node configured to provide a radio access network to a user equipment, information for the local access for the radio access network;

passing, from the resource node and to a managing node to trigger the managing node to select at least one parameter for a new traffic flow for the user equipment, the selection based at least in part on the information, the at least one parameter including a cost parameter; and enforcing quality of service control for the new traffic flow, by the resource node, the enforcing based on the at least one parameter for the new traffic flow.

22. A non-transitory computer readable medium that, when executed by at least one processor, performs instructions comprising:

managing, at a node, a traffic flow;

receiving, at the node and from a resource node configured to provide a radio access network to a user equipment, information for the local access for the radio access network;

selecting at least a quality of service parameter and a charging parameter for a new traffic flow for the user equipment, the selection based at least in part on the information; and sending the at least one parameters to the resource node to trigger the resource node to enforce quality of service control for the new traffic flow, based on the at least one parameters for the new traffic flow.

* * * * *